(12) United States Patent
Ishii

(10) Patent No.: US 7,602,574 B2
(45) Date of Patent: Oct. 13, 2009

(54) STORAGE APPARATUS, STORAGE MEDIUM, AND CONTROL METHOD AND PROGRAM OF STORAGE APPARATUS

(75) Inventor: Koji Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/900,564

(22) Filed: Sep. 12, 2007

(65) Prior Publication Data
US 2008/0123217 A1 May 29, 2008

Related U.S. Application Data

(63) Continuation of application No. PCT/JP2005/004942, filed on Mar. 18, 2005.

(51) Int. Cl.
*G11B 21/02* (2006.01)
*G11B 5/09* (2006.01)

(52) U.S. Cl. .......................... 360/75; 360/48

(58) Field of Classification Search ........................ None
See application file for complete search history.

(56) References Cited

U.S. PATENT DOCUMENTS 6,975,472 B2 * 12/2005 Stover et al. ................. 360/59

7,330,323 B1 * 2/2008 Singh et al. ................. 360/48
7,375,914 B1 * 5/2008 Dieron et al. ............... 360/75
2004/0252396 A1 * 12/2004 Pleiss ......................... 360/55

FOREIGN PATENT DOCUMENTS

| JP | 2001-057010 | 2/2001 |
| JP | 2003-141703 | 5/2003 |
| JP | 2003-157505 | 5/2003 |
| JP | 2004-030898 | 1/2004 |
| JP | 2004-110918 | 4/2004 |

* cited by examiner

*Primary Examiner*—Andrew L Sniezek
(74) *Attorney, Agent, or Firm*—Greer, Burns & Crain, Ltd.

(57) ABSTRACT

In a storage medium to which information is recorded by using a write head of an inductive type, in addition to a servo section in which servo information is recorded and a data section to which data is to be written, a write training section on which training write of pseudo-data is to be performed is disposed on a recording track. When the temperature is low, a write control unit writes the pseudo-data to the write training area and then writes data to the data area. By writing the pseudo-data to the write training area, a write core is heated and caused to project toward the medium surface side by thermal expansion, and the writing ability is enhanced; then, the data is written to the data section. A write training section is also disposed in front of a data section in a track of a system area of the storage medium, and, when the temperature is low, and when system information is to be written to the data section of the system area, pseudo-data is written to the write training section.

18 Claims, 14 Drawing Sheets

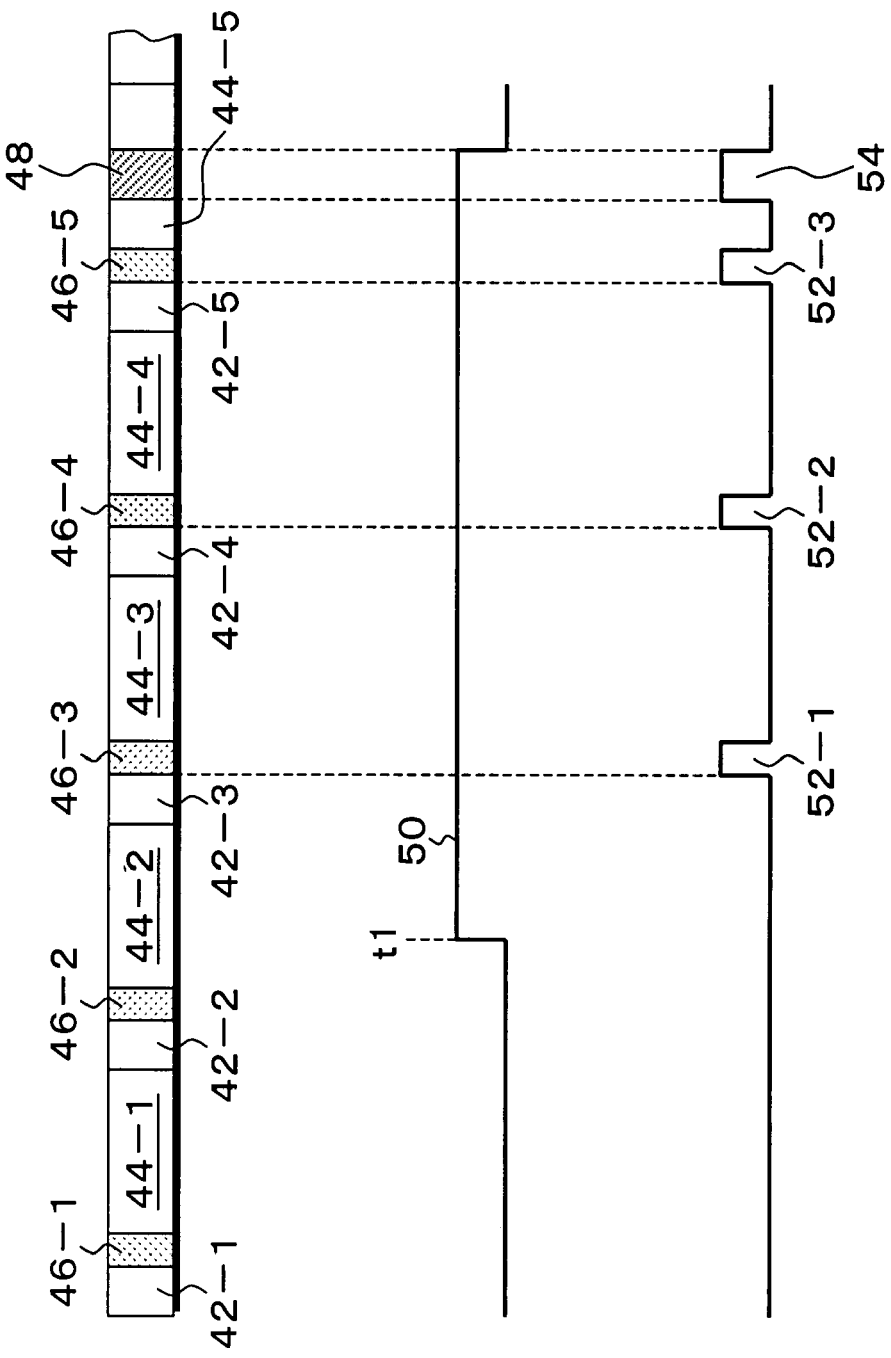

FIG. 6A TRACK

FIG. 6B WRITE COMMAND

FIG. 6C WRITE GATE

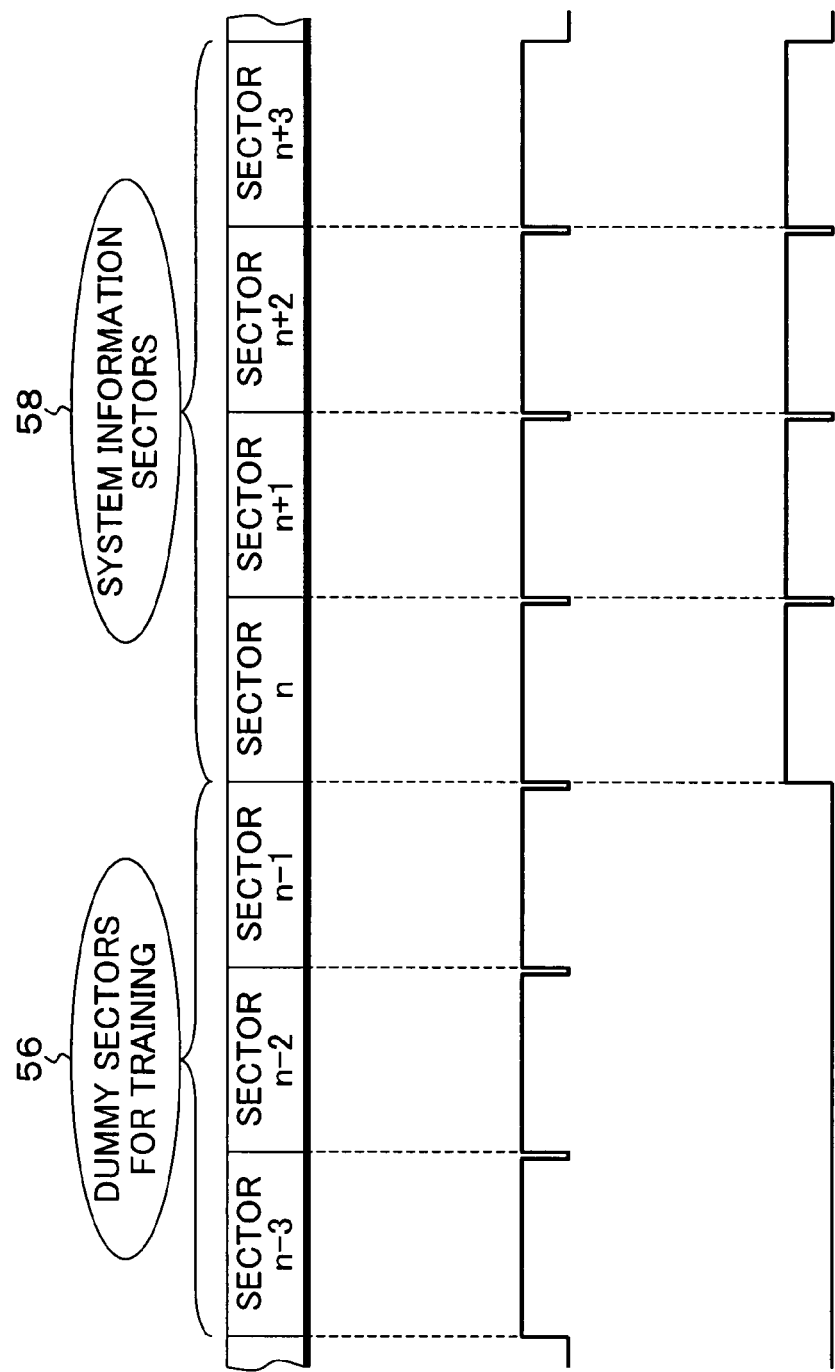

US 7,602,574 B2

STORAGE APPARATUS, STORAGE MEDIUM, AND CONTROL METHOD AND PROGRAM OF STORAGE APPARATUS

This application is a continuation of PCT/JP2005/004942 filed Mar. 18, 2005.

TECHNICAL FIELD

The present invention relates to a storage apparatus which records and reproduces data onto or from tracks of a storage medium by using a head, the storage medium, and a control method and program of the storage apparatus and particularly relates to the storage medium and the control method and program of the storage apparatus which improve writing performance in a low-temperature environment.

BACKGROUND ART

Conventionally, downsizing and capacity increase of magnetic disk apparatuses has progressed, and they are widely used in devices such as PDAs, portable phones, and car navigation devices, other than computers. Such a magnetic disk apparatus records information on a magnetic disk medium by using a head, and the non-contact type in which, as shown in FIG. 1A, a head 100 on which a head core 104 is disposed at a distal end of a head slider 102 flies over a medium surface by virtue of airflow 108 between it and the medium surface 106 is the mainstream. Meanwhile, in a low-temperature environment, for example in the winter, since the air density is comparatively high, the head 100 is caused to fly higher by the airflow 108 as shown in FIG. 1B, the head core 104 gets away from the medium surface 106, and the writing performance is reduced. When a write current is increased in order to compensate for such reduction in the writing performance, the large write current flows through the write core 104 and generates heat, the volume of the head core 104 is increased as shown in FIG. 1C due to thermal expansion, thereby causing projection of the head core 104, and the writing performance is increased since the head 100 is closer to the medium surface 106. Due to such a phenomenon of the head upon writing in a low-temperature environment, when data is written to sectors of a disk medium in a low-temperature environment, the writing performance is low at a top part of the sectors from which writing is started since the head core is not projected thereat, and the writing performance recovers during the writing since the head core is projected due to thermal expansion. Therefore, the phenomenon that the error rate is deteriorated at the top part of the sectors on which writing is performed and it becomes hard to be read occurs. In order to solve such problem of deterioration in the error rate in the low-temperature environment, under the current circumstances, screening of heads in which the heads which cause deterioration in the error rate at sector tops are eliminated is performed, and the head yield is therefore deteriorated. Also regarding completed magnetic disk apparatuses, screening of eliminating the apparatuses which cannot obtain a required error rate by a test operation in a low-temperature environment is performed, and the yield of the apparatuses is deteriorated. In order to solve such problem in manufacturing, in a conventional magnetic disk apparatus, write-verify read in which written data is immediately read and checked is executed, and write is performed again when it cannot be correctly read, thereby suppressing writing failure in a low-temperature environment (JP2003-141703). Moreover, as another method, a sector in front of a target write sector is once read and stored in a memory, pseudo-data is then written to respective sectors, and a process of writing data to the write sector from the sector in front together with the once read data is then performed, thereby ensuring stable operation in a low-temperature environment (JP2004-110918).

Patent Document 1: Japanese Patent Application

However, such conventional magnetic disk apparatuses have a problem that a write process in a low-temperature environment requires the processing time corresponding to that of several cycles of a disk, the processing time with respect to a write request from a host is increased, and the input/output performance is reduced. Moreover, the method of improving the error rate at the sector top part by increasing the write current has a problem that the write current for heating cannot be greatly increased since there is erasing influence to adjacent tracks since data areas are used, the restricted write current takes time in heating, and the error rate is deteriorated during that time. It is an object of the present invention to provide a highly reliable and responsive storage apparatus, storage medium, control method and program of the storage apparatus which can reliably perform write at the sector top part in a low-temperature environment without lengthening the processing time viewed from a host and without causing deterioration in the error rate.

DISCLOSURE OF INVENTION

The present invention provides a storage apparatus. In the present invention, the storage apparatus for recording information by using an inductive-type write head is characterized by having a storage medium in which, in addition to a servo section in which servo information is recorded and a data section to which data is to be written, a write training section on which training write of pseudo-data is to be performed is disposed on a recording track; and a write control unit which writes the pseudo-data to the write training area and then writes data to the data section.

Herein, in the storage medium, the servo section, the data section, and the write training section are repeatedly disposed on the recording track. Moreover, in the storage medium, the write training section is disposed immediately after the servo section. Furthermore, the data section of the storage medium is divided into a plurality of sectors, and the write training section is disposed in front of the top sector of the plurality of sectors.

When a write command is received in a low-temperature state in which a use temperature is equal to or less than a predetermined temperature, the write control unit writes the pseudo-data to the write training section. When a write command is received in a low-temperature state in which a use temperature is equal to or less than a predetermined temperature, the write control unit writes the pseudo-data to the write training section which is present between the point when the write head becomes writable on a target track and the data section serving as a write target.

When a write command is received in a low-temperature state in which a use temperature is equal to or less than a predetermined temperature, the write control unit selects a write training section from among a plurality of write training sections present between the point when the write head becomes writable on a target track and the data section serving as a write target and writes the pseudo-data to the write training section so that the lower the temperature, the fewer the skipping number.

When a write command is received in a low-temperature state in which a use temperature is equal to or less than a predetermined temperature, the write control unit selects a write training section from among a plurality of write training sections present between the point when the write head becomes writable on a target track and the data section serving as a write target and writes the pseudo-data to the write training section so that the lower the temperature, the larger the number of times of training.

In a low-temperature state in which a use temperature is equal to or less than a predetermined temperature, the write control unit continuously writes the pseudo-data to the write training section without depending on a write command. In this case, the write control unit may select the write training section and write the pseudo-data to the write training section so that the lower the use temperature, the fewer the skipping number. Moreover, the write control unit may select the write training section and write the pseudo-data to the write training section so that the lower the use temperature, the larger the number of training times.

Furthermore, in the present invention, a write training section is disposed in front of a data section on a track of a system area which saves system information in the recording medium; and the write control unit writes the pseudo-data to the write training section when system information is to be written to the data section of the system area in the low-temperature state in which a use temperature is equal to or less than a predetermined temperature.

The present invention provides a recording medium. In the present invention, the storage medium for recording information by using an inductive-type write head is characterized in that, in addition to a servo section in which servo information is recorded and a data section to which data is to be written, a write training section on which training write of pseudo-data is to be performed is disposed on a recording track.

The present invention provides a control method of a storage apparatus. In the present invention, the control method of a storage apparatus for recording information by using a write head of an inductive type, the apparatus having a storage medium in which, in addition to a servo section in which servo information is recorded and a data section to which data is to be written, a write training section on which training write of pseudo-data is to be performed is disposed on a recording track, is characterized by including a step of detecting a use temperature of the storage apparatus; and, when the use temperature is equal to or less than a predetermined temperature, a write control step of writing the pseudo-data to the write training area and then writing data to the data area.

The present invention provides a program executed by a computer of a storage apparatus. The program of the present invention is characterized by causing a computer of a storage apparatus for recording information by using a write head of an inductive type, the apparatus having a storage medium in which, in addition to a servo section in which servo information is recorded and a data section to which data is to be written, a write training section on which training write of pseudo-data is to be performed is disposed on a recording track to execute a step of detecting a use temperature of the storage apparatus; and, when the use temperature is equal to or less than a predetermined temperature, a write control step of writing the pseudo-data to the write training area and then writing data to the data area.

According to the present invention, when data is to be written to the target sector on the target track based on the write command in a low-temperature environment, the head is heated by writing the pseudo-data to the write training sections present in the part before the target sector, the writing ability can be increased by causing the write core to project toward the medium surface by thermal expansion before it reaches the target sector, deterioration in the error rate at the top part of the target sector can be improved, and highly-reliable data writing can be ensured even in the low-temperature environment.

Moreover, the writing ability can be enhanced by heating and projecting the write core by writing the pseudo-data to the write training sections present in the part that is before the head reaches the data section in which the writing target sector is positioned; therefore, improvement in the error rate at the sector top part does not require the process involving plural times of medium rotation, the processing time same as a normal case is required with respect to the write request from the host even in the low-temperature environment, and deterioration in the writing performance can be reliably prevented.

BRIEF DESCRIPTION OF DRAWINGS

FIGS. 4A to 4C are time charts of write control when a write command is received in a low-temperature environment;

FIGS. 13A to 13C are time charts of write control of the present invention involving training write in a system information storage area of the disk medium.

BEST MODE FOR CARRYING OUT THE INVENTION

Figure 2A:
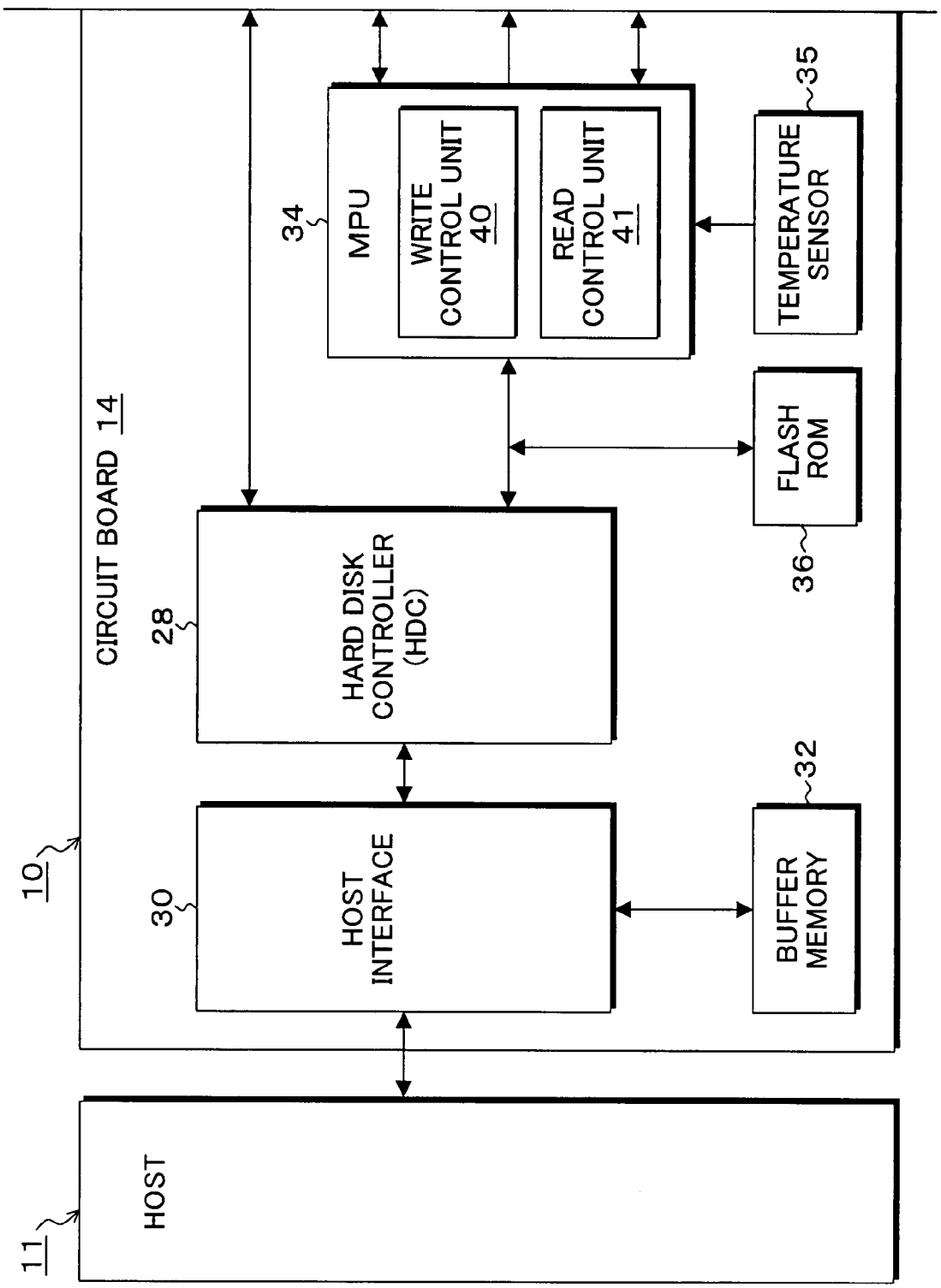
FIGS. 2A and 2B are block diagrams of a magnetic disk apparatus to which write training of the present invention is applied.
Figure 2B:
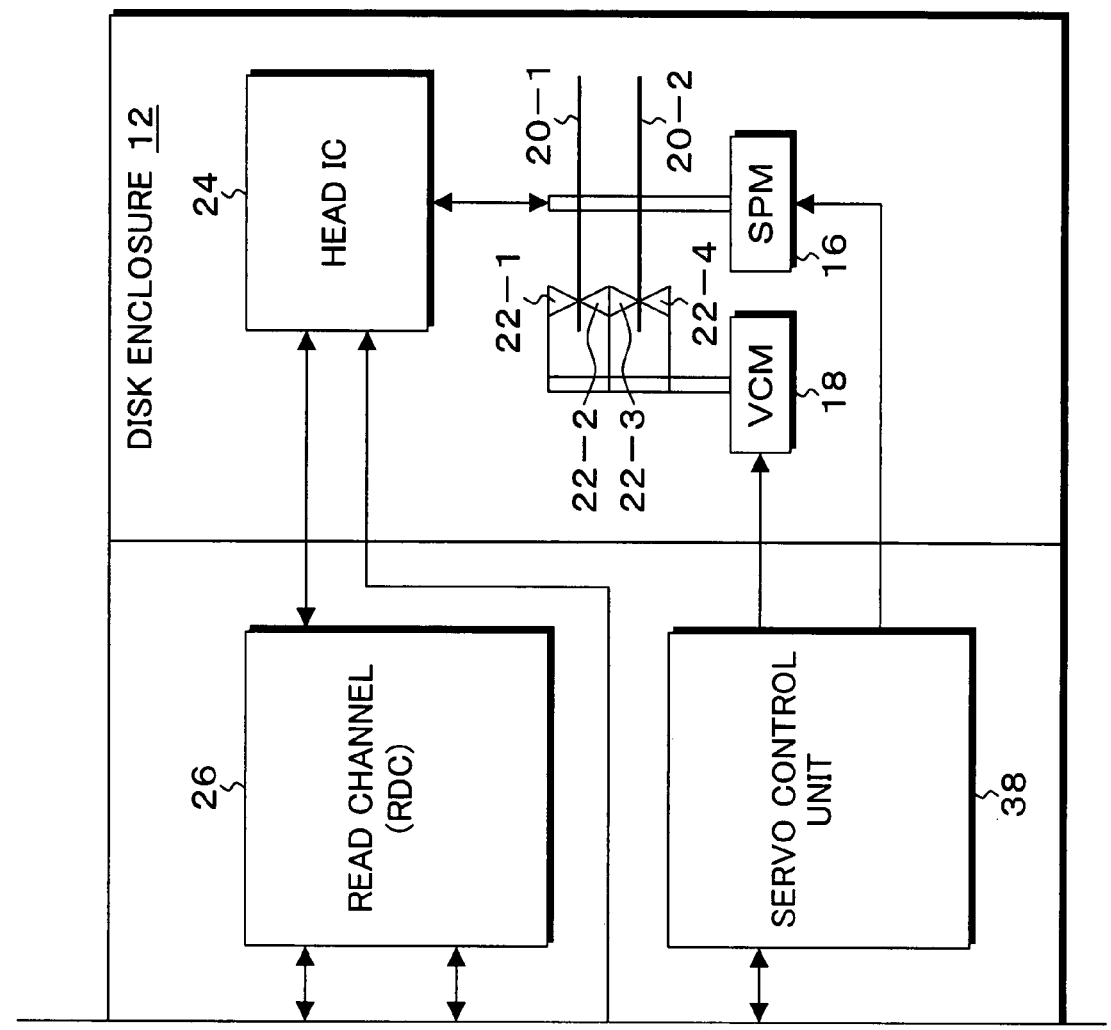

FIGS. 2A and 2B are block diagrams of a magnetic disk apparatus to which write control involving training write of the present invention is applied. In FIGS. 2A and 2B, the magnetic disk apparatus 10 known as a hard disk drive (HDD) comprises a disk enclosure 12 and a circuit board 14. In the disk enclosure 12, a spindle motor 16 is provided, and disk media 20-1 and 20-2 are attached to a rotating shaft of the spindle motor 16 and rotated at a certain rotating speed, for example, at 4200 rpm. A voice coil motor 18 is provided in the disk enclosure 12, and the voice coil motor 18 has heads 22-1 to 22-4 mounted on arm distal ends of a head actuator and performs positioning of the heads with respect to recording surfaces of the disk media 20-1 and 20-2. In each of the heads 22-1 to 22-4, a write head and a read head are integrated and mounted on a head slider. The head slider is opposed to the surface of the disk medium 20-1 or 20-2 by a medium-opposed surface. The head slider 23 comprises a slider main body made of $AL_2O_3$—TiC (ALTIC) and a head element built-in film made of $Al_2O_3$ (alumina) which is joined with an air-outflow end of the slider main body. In addition, a so-called magnetic head element, i.e., an electromagnetic conversion element is mounted on the head slider. The electromagnetic conversion element comprises, for example, a writing element such as a thin film magnetic head (inductive type) which writes information on a magnetic disk by utilizing a magnetic field generated by a thin film coil pattern and a reading element such as a giant magnetoresistance effect (GMR) element or a tunnel junction magnetoresistance effect (TMR) element which reads information from the magnetic disk by utilizing resistance change of a spin valve film or a tunnel junction film. The heads 22-1 to 22-4 are connected to a head IC 24 by signal lines, and, in accordance with a head select signal based on a write command or a read command from a host serving as an upper-level apparatus, the head IC selects any one of the heads which performs write or read. In addition, in the head IC 24, a write amplifier is provided for a write system, and a pre-amplifier is provided for a read system. In the circuit board 14, a read channel 26, a hard disk controller 28, a host interface 30, a buffer memory 32, a MPU 34, a temperature sensor 35, and a flash ROM 36 are provided. The magnetic disk apparatus 10 performs normal writing processes and reading processes based on commands from the host. Herein, normal operations in the magnetic disk apparatus will be described below. When a write command and write data from the host are received by the host interface 30, the write command is decoded by a write control unit 40 of the MPU 34, and the received write data is converted into a predetermined data format by a formatter provided in the hard disk controller 28 including buffering of the buffer memory 32 in accordance with needs. In addition, an ECC code is added thereto by an ECC processing unit, which is not shown, and scrambling, RLL code conversion, and write compensation is performed in a write system in the read channel 26. Then, through intermediation from a write amplifier to the head IC 24, it is written, for example, from the write head of the selected head 22-1 to the disk medium 20-1. In this course, a head positioning signal is given from the MPU 34 to the servo control unit 38 using a DSP or the like, and, after seek of the head to a position ordered by the command is performed by the voice coil motor 18, positioning control of placing it on a track is performed. On the other hand, when a read command from the host is received by the host interface 30, the read command is decoded by a read control unit 41 of the MPU 34, and a read signal read from a read head selected by head selection of the head IC 24 is amplified by a read amplifier. Then, it is input to the read system of the read channel 26, the read data is demodulated by, for example, partial response maximum likelihood detection (PRML), and errors are detected an corrected by performing ECC processing by the hard disk controller 28. Then, it is subjected to buffering to the buffer memory 32, and the read data is transferred to the host from the host interface 30. In the magnetic disk apparatus 10 according to the present invention, in order to ensure writing performance under a low-temperature environment, on recording tracks of the disk surfaces of the disk media 20-1 and 20-2 corresponding to the heads 22-1 to 22-4, in addition to servo sections in which servo information is recorded and data sections on which write or read of data is to be performed, write training sections on which training write of pseudo-data is to be performed are disposed by performing track formatting. In the case of a low-temperature environment, in which the temperature detected by the temperature sensor 35 is, for example, 15° C. or less, when a write command is received from the host, the write control unit 40 of the MPU 34 executes write control in which the pseudo-data is written to the write training sections on a target track and, then, data is written to a target sector of the data section.

Figure 3A:
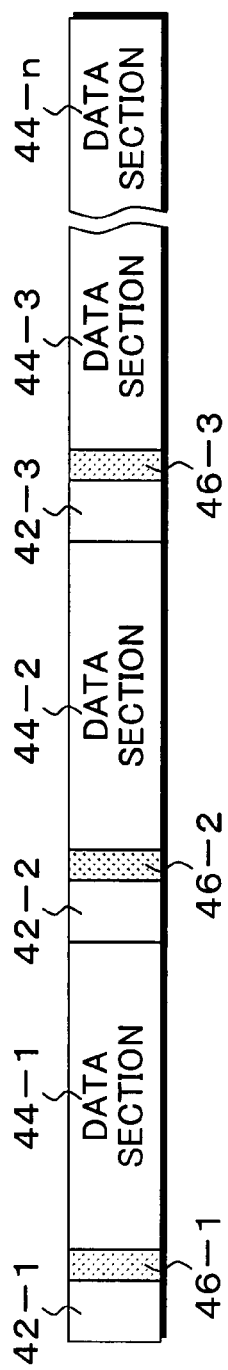
FIGS. 3A to 3C are explanatory diagrams of track formats of the magnetic disk apparatus of FIGS. 2A and 2B.
Figure 3B:
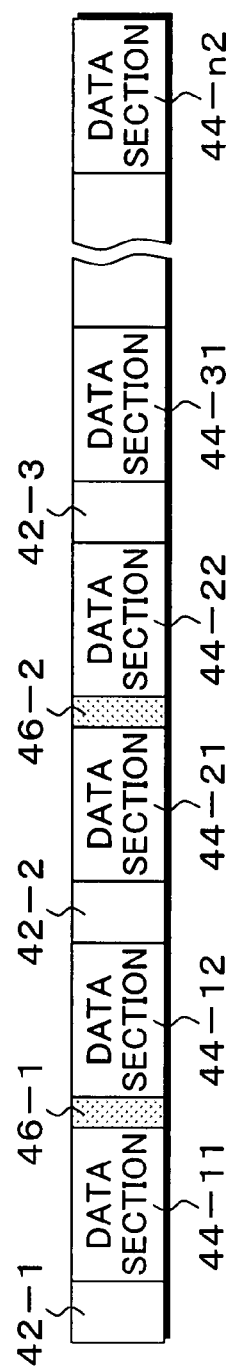
Figure 3C:
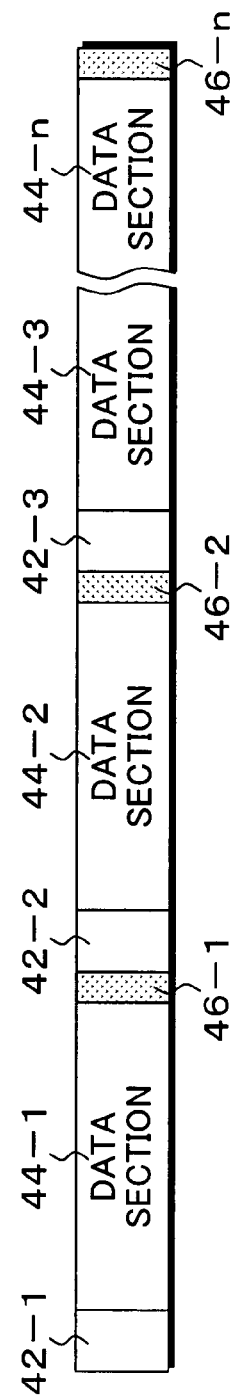

FIGS. 3A to 3C are explanatory diagrams of track formats of recording tracks on the disk surfaces of the disk media 20-1 to 20-4 provided in the magnetic disk apparatus of FIGS. 2A and 2B.

FIG. 3A shows a first embodiment of the track format of the disk medium in the present invention, wherein servo sections 42-1, 42-2, . . . 42-n (not shown) in which servo information is recorded at constant intervals are disposed on the track, and data sections 44-1, 44-2, 44-3 to 44-n to which user data is to be written are disposed therebetween. In addition to that, in the present invention, in this embodiment, write training sections 46-1, 46-2, 46-3, . . . 46-n (not shown) are disposed immediately after the servo sections 42-1, 42-2, and 42-3. The number of the servo sections 42-1 to 42-n (not shown) disposed on the track is, for example, about 160 to 170 when the number of rotations of the disk medium is 4200 rpm or about 120 to 130 when the disk medium is at 5200 rpm. Each of the data sections 44-1 to 44-n is allocated in the unit of a sector having a predetermined length, for example, a sector of 512 bytes. Each of the write training 46-1 to 46-n (not shown) undergoes writing of dummy data when data is to be written to a target sector according to a write command in a low-temperature environment. A write core of the head is heated by writing the dummy data, the write core is caused to project toward the disk surface side by thermal expansion so as to improve the writing performance, and then data write is performed when it reaches the target sector. Specifically, heat is generated and thermal expansion is caused when a write current flows through the thin film coil of the head, and a protective film in the vicinity thereof or, for example, the film of a MR head of the reading head undergoes thermal expansion; as a result, the write core projects toward the disk surface side. The dummy data written to the write training sections 46-1 to 46-n (not shown) may be any data since heating of the write core is the object; however, data which exhibits high heating efficiency and uses large write electric power such as DC data or "010101 . . . " is used. As the write current of the write training sections 46-1 to 46-n (note shown), a sufficiently large current which may erase adjacent tracks can be caused to flow since erasing the adjacent tracks does not cause a problem. Furthermore, as the data size of the write training sections 46-1 to 46-n (note shown), a data capacity that is equal to or less than several percent which does not affect the total capacity of the disk medium is allocated. Herein, the problematic part in a low-temperature environment is about one to two sectors from a write starting position, and, currently, the number of sectors between the servo sections is, for example, seven to eight sectors. Therefore, when the write training sections which are about 3% the data area are provided, by starting training write from a position before a target sector by about five servo sections, when it reaches the top position of the target sector, expansion and projection of the write core caused by heating which is required for improving the writing performance can be realized. As a matter of course, how much before that the training write is to be started is adjusted to optimize that in accordance with the characteristic of the used head. The track format of FIG. 3A is disposed on the disk medium through a formatting process by servo track write equipment in a manufacturing stage of the magnetic disk apparatus of FIGS. 2A and 2B and by track format equipment thereafter. With respect to a format provided in the hard disk controller 28 of FIGS. 2A and 2B, the write gate and read gate according to the track format of FIG. 3A are generated. Among these, regarding the write gate, in write control involving training write in a low-temperature environment, a write gate for the training write for writing dummy data is generated with respect to one or a plurality of write training sections which are positioned before a target sector.

FIG. 3B shows another embodiment of the track format used in the disk medium of the present invention, and this embodiment is characterized in that the write training sections 46-1 and 46-2 to 46-n (not shown) are moved from the positions in FIG. 3A immediately after the servo sections to those in the data sections and disposed therein. Because of the disposal of the write training sections 46-1 to 46-n (not shown), each of the data sections 44-1 to 44-n of FIG. 3A is divided into two areas like into data sections 44-11 and 44-12 or into data sections 44-21 and 44-22.

FIG. 3C shows another embodiment of the track format of the disk medium of the present invention, and this embodiment is characterized in that the write training sections 46-1, 46-2, . . . , 46-n are disposed at the end of the data sections 44-1, 44-2, . . . 44-n, in other words, in front of the servo sections 42-1, 42-2, 42-3, . . . 42-n (not shown). Furthermore, the track formats of the disk medium used in the present invention are not limited to those of FIGS. 3A to 3C, and, for example, the write training section may be incorporated as an area in the servo section.

Figure 1A:
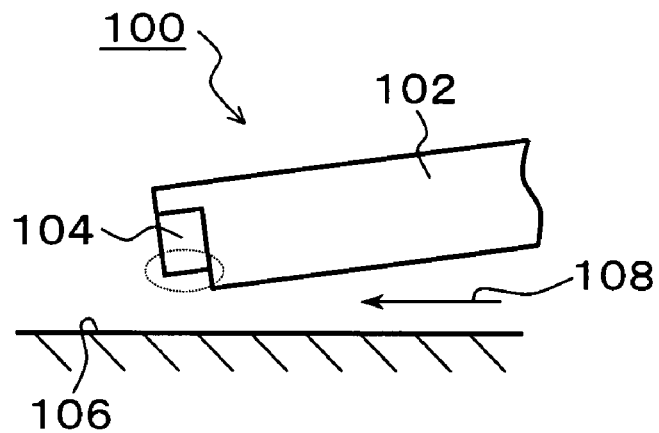
FIGS. 1A to 1C are explanatory diagrams of a phenomenon that the writing ability is improved by expansion and projection of a write core caused by heating upon writing in a low-temperature environment in a flying-type head.
Figure 1B:
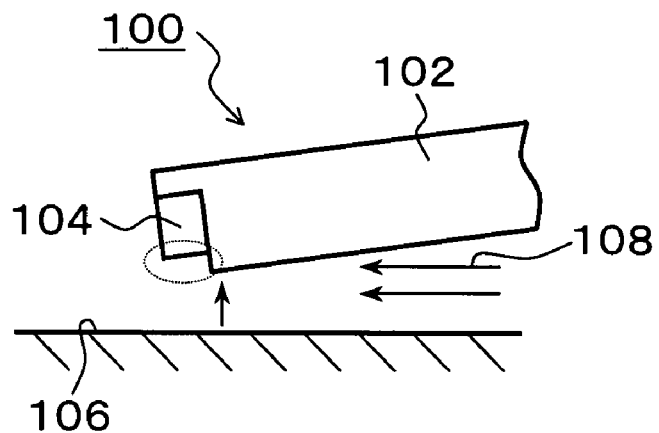
Figure 1C:
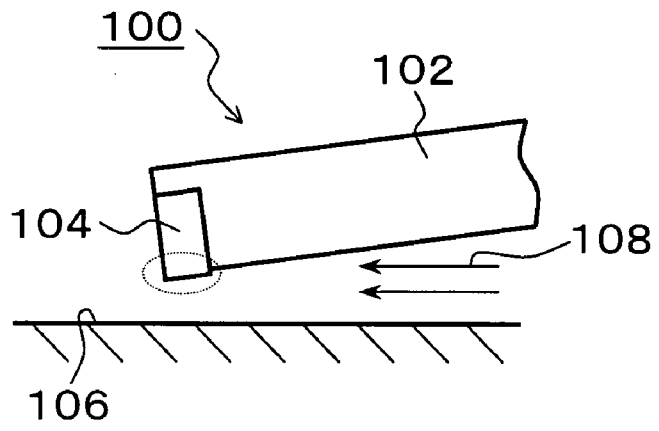

FIGS. 4A to 4C are time charts of write control of the present invention when a write command is received in a low-temperature environment. FIG. 4A shows a track format of a target track, FIG. 4B shows the write command, and FIG. 4C shows a write gate. In the state in which the head is positioned on a track wherein the track of FIG. 4A serves as the target track, the write command is issued at time t1, and it is assumed that a target sector 48 according to the write command is present in a data section 44-5 of the track. When the temperature detected by the temperature sensor 35 of FIGS. 2A and 2B is equal to or less than a predetermined temperature, for example, 15° C., by which a predetermined low-temperature environment is determined, the write control unit 40 of FIGS. 2A and 2B orders training write with respect to the format of the hard disk controller 28, thereby, as shown in FIG. 4C, tuning on the write gate and performing training write 52-1, 52-2, and 52-3 with respect to the write training sections 46-3, 46-4, and 46-5 which are present after the issue of the write command at the time t1 and before the target sector 48, and then performs data write 54 with respect to the target sector 48. In the write control involving such training write, until it reaches the target sector 48, the training write 52-1, 52-2, 52-3 is executed by writing dummy data such as DC or "010101 . . . " to the three write training sections 46-3, 46-4, and 46-5. By virtue of the training write, the write core of the head is heated, the head core 104 projects toward the side of the medium surface 106 as shown in FIG. 1C, and the writing performance is improved. The data write of the target sector 48 can be started in this state, the data can be written from the top part of the target sector with the high writing performance even in the low-temperature environment, and the problem that the error rate is deteriorated at the top part of the target sector can be reliably prevented.

Figure 5:
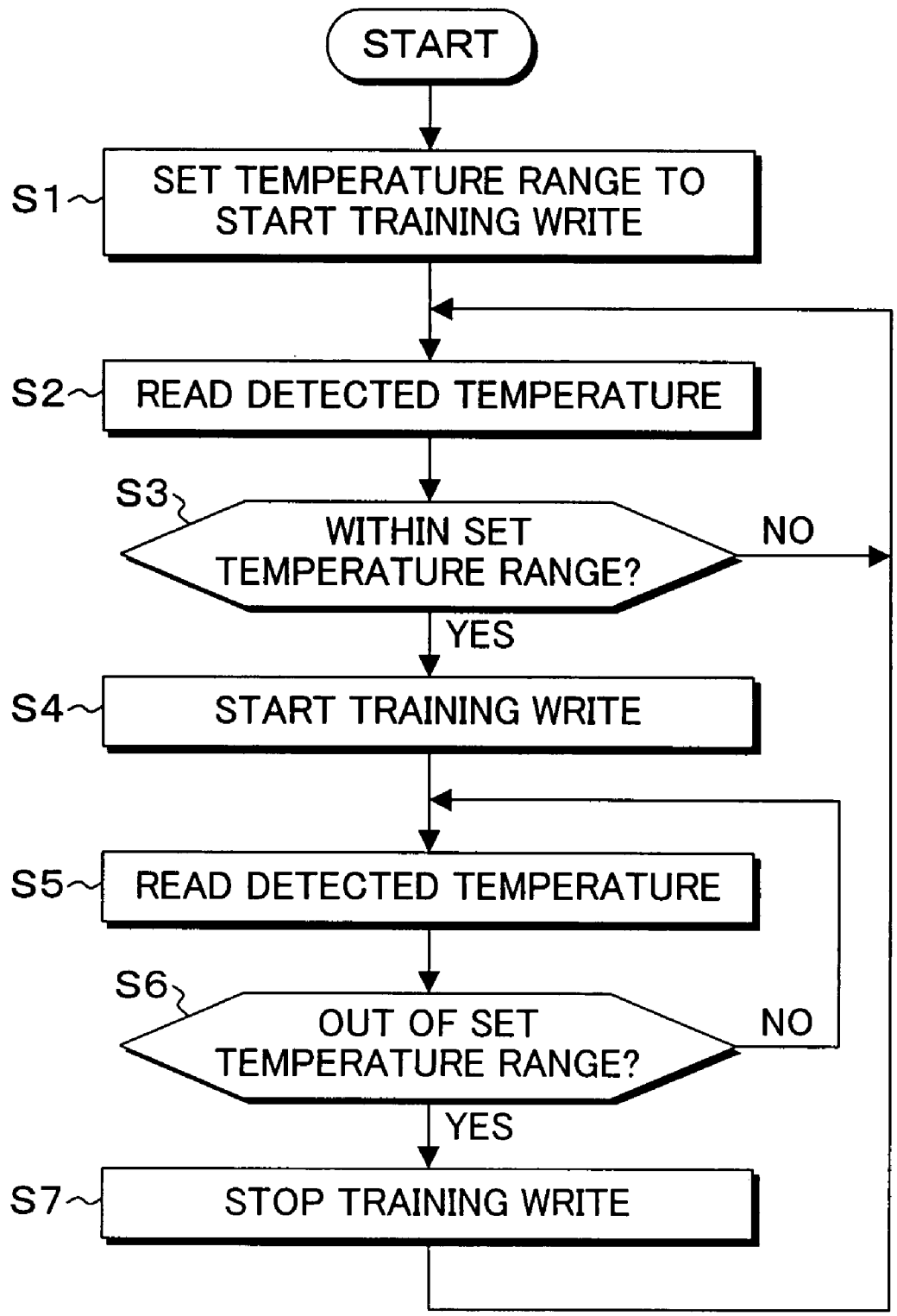
FIG. 5 is a flow chart of the write control of the present invention involving training write.

FIG. 5 is a flow chart of the write control involving training write. In FIG. 5, when the power of the magnetic disk apparatus is turned on to start it up, a temperature range in which training write is started is set in step S1. Subsequently, the detected temperature detected by the temperature sensor 35 is read in step S2, and whether it is within the temperature range or not is checked in step S3. When it is within the set temperature range, in other words, when it is determined to be in a low-temperature environment, the process proceeds to step S4, and training write is started. Subsequently, the detected temperature is read in step S5, and, when it is out of the set temperature range in step S6, the training write is stopped in step S7. The writing process which is performed with respect to the write command when the training write is started in step S4 is same as that shown in the time chart of FIGS. 4A to 4C. Note that, in the time chart of FIGS. 4A to 4C, the write control involving training write which is performed when the write command is received in the state in which the head is positioned on the target track is taken as an example. However, when the head is positioned on another track when the write command is received, the head is moved to the target track by seek control, and the timing at which on-track is detected is assumed as the issue timing of the write command of time t1 of FIGS. 4A to 4C. Then, training write of writing dummy data to the write training sections which are present before the head reaches the target sector is executed.

Figure 6:
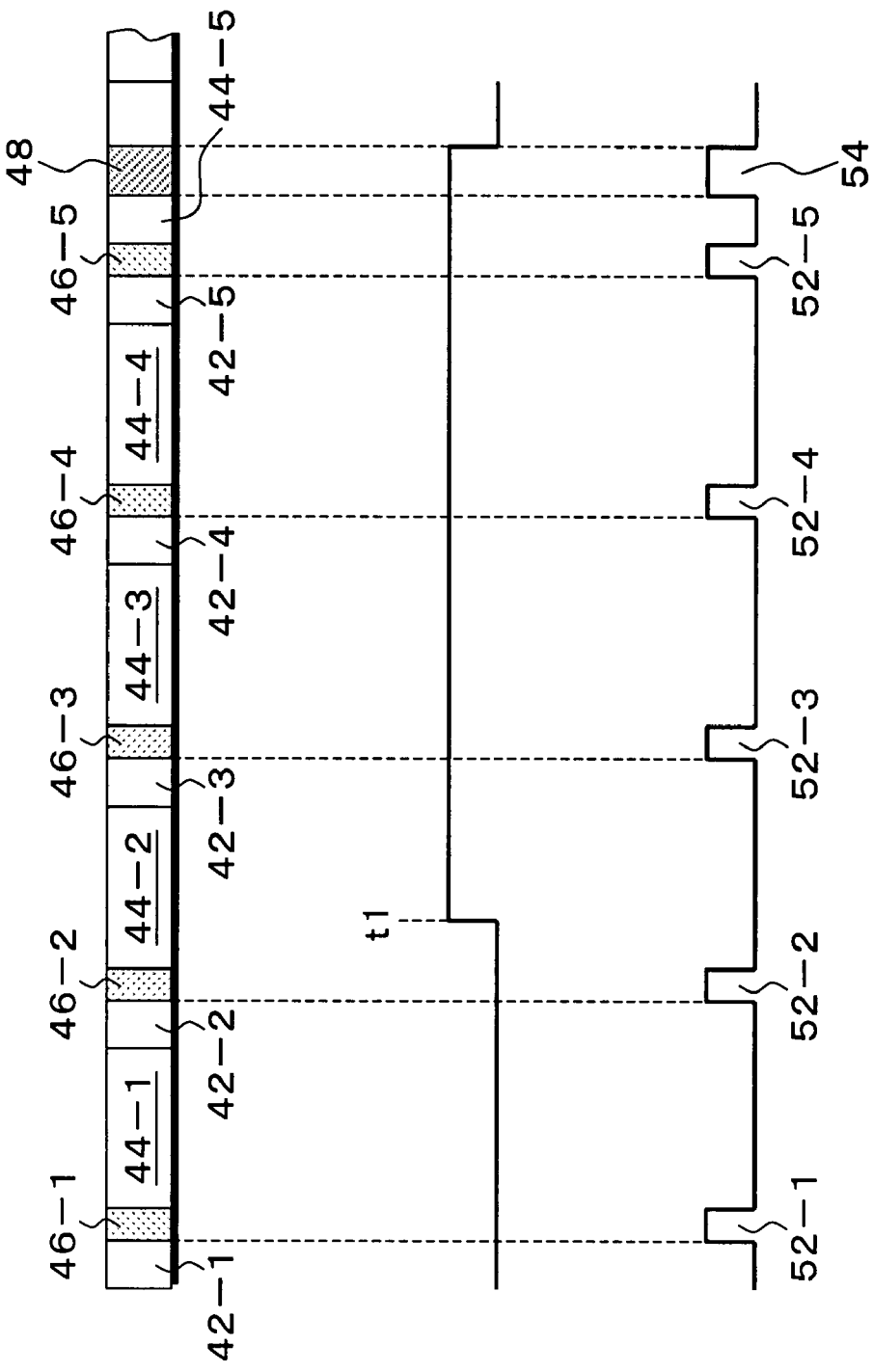
FIGS. 6A to 6C are time charts of a control process of the present invention in which training write is continuously executed without depending on a write command in a low-temperature environment.

FIGS. 6A to 6C are time charts of another control process of the present invention in which training write is continuously executed without depending on a write command in a low-temperature environment.

FIG. 6A shows the target track in which the target sector 48 is present, FIG. 6B shows the write command, and FIG. 6C shows the write gate. In the embodiment of FIGS. 6A to 6C, training write is started in the state in which the head is positioned on the target track in which the target sector 48 is present. Therefore, regardless whether the write command is issued at the time t1 or not, as shown by the write gate of FIG. 6C, the write gate signal becomes effective at the timing of the write training sections 46-1, 46-2, 46-3, 46-4, 46-5 . . . 46-n (not shown) in the track, thereby continuously repeating training write 52-1, 52-2, 52-3, 52-4, 52-5, . . . 52-n (not shown). Therefore, when the write command is issued at the time t1, the head core is already sufficiently heated by the training write and projected toward the disk surface side by thermal expansion, thereby enhancing the writing performance; and, in the data write 54 with respect to the target sector 48, data is written from the sector top with the sufficient writing performance, and deterioration in the error rate at the sector top is prevented.

Figure 7:
FIG. 7 is an explanatory diagram of a control table in which the skipping numbers of training write corresponding to set temperature ranges are registered.

FIG. 7 is an explanatory diagram of a control table in which the skipping numbers of training write corresponding to the ranges of set temperatures to be used for optimizing training write in accordance with the temperature in a low-temperature environment are registered. In the control table 60 of FIG. 7, the temperature ranges are separated into that of less than 0° C., equal to or more than 0° C. and less than 5° C., equal to or more than 5° C. and less than 10° C., equal to or more than 10° C. and less than 15° C., and equal to or more than 15° C., and they are set so that the lower the temperature, the less the skipping number of training write. Note that training write is turned off at 15° C. or more.

Figure 8:
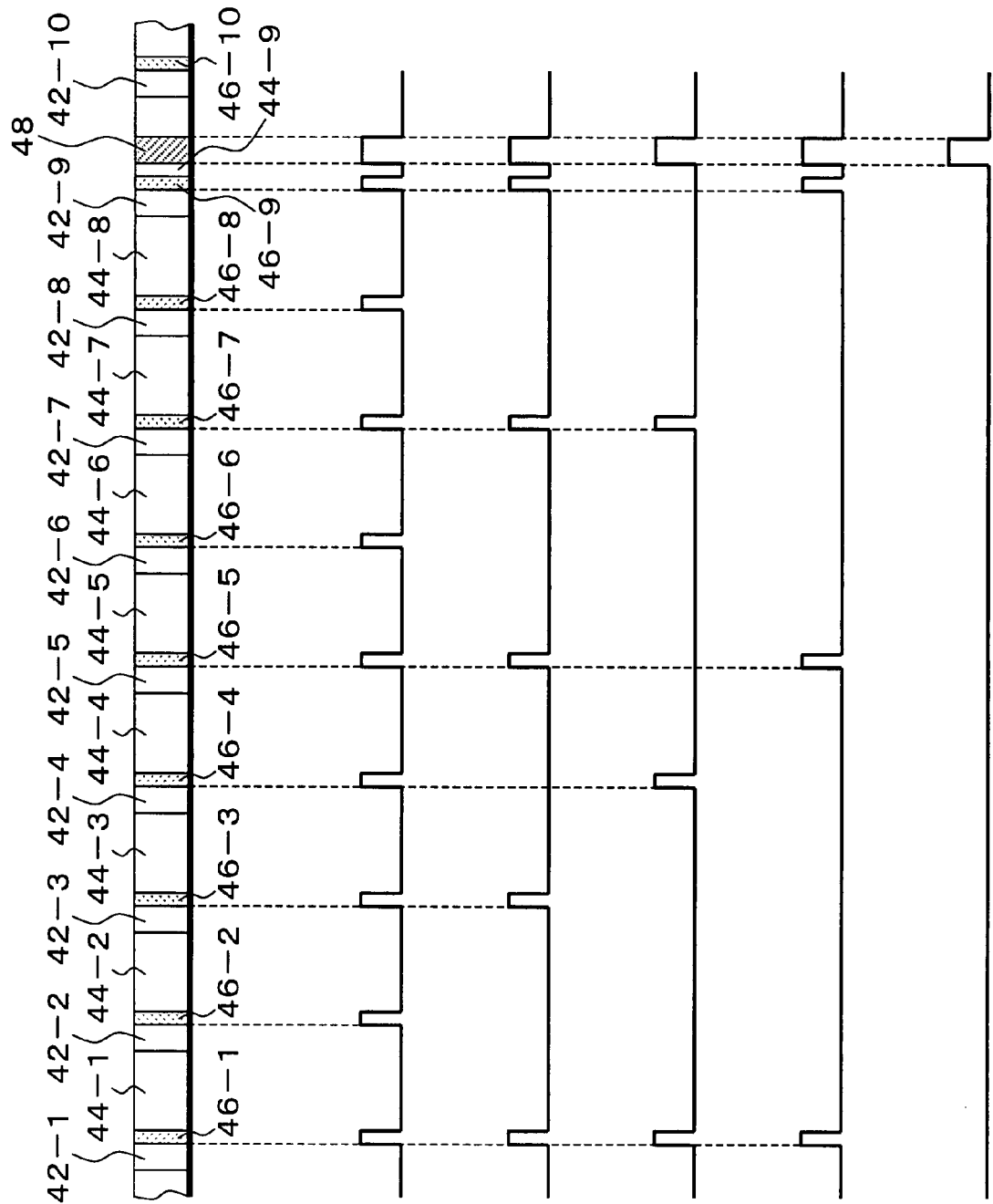
FIGS. 8A to 8F are time charts of write control according to the present invention in which the number of skipping training write is changed corresponding to the detected temperature by using the control table of FIG. 7.

FIGS. 8A to 8F are time charts of write control of the present invention in which the skipping number of training write is changed in accordance with the detected temperature by using the control table 60 of FIG. 7. FIG. 8A shows a track format of a target track to which write is performed, and the target sector 48 is present in a data section 44-9. FIGS. 8A to 8F show the timing of training write by the write gate corresponding to the temperature ranges of the control table 60 of FIG. 7. Since the skipping number is 0 in the case of FIG. 8B wherein it is 0° C. or less, dummy data is written to all of the write training sections 46-1 to 46-9.

In FIG. 8C, the range is equal to or more than 0° C. and less than 5° C., and the skipping number=1 in this case; therefore, the write gate becomes effective at the timing of the write training 46-1, 46-3, 46-5, 46-7, and 46-9, thereby executing training write.

In FIG. 8D, the range is equal to or more than 5° C. and less than 10° C., and the skipping number=2 in this case; therefore, the write gate becomes effective at the timing of the write training 46-1, 46-4, and 46-7, thereby executing training write.

In FIG. 8E, the range is equal to or more than 10° C. and less than 15° C., and the skipping number=3 in this case; therefore, the write gate becomes effective at the timing of the write training 46-1, 46-5, and 46-9, thereby executing training write. Furthermore, the case of FIG. 8F is the case of 15° C. or more, and the training write is turned off in this case. The temperature ranges are thus-divided for a low-temperature environment so that the lower the temperature, the less the skipping number of training write; consequently, the frequency of training write is reduced when the temperature is comparatively high even in the low-temperature environment, and the writing performance can be enhanced without heating the write core more than needed. On the other hand, when the temperature is low, the writing performance is enhanced by reducing the skipping number so as to increase the frequency of the write training and sufficiently heating the write core with respect to the low temperature to project it.

Figure 9:
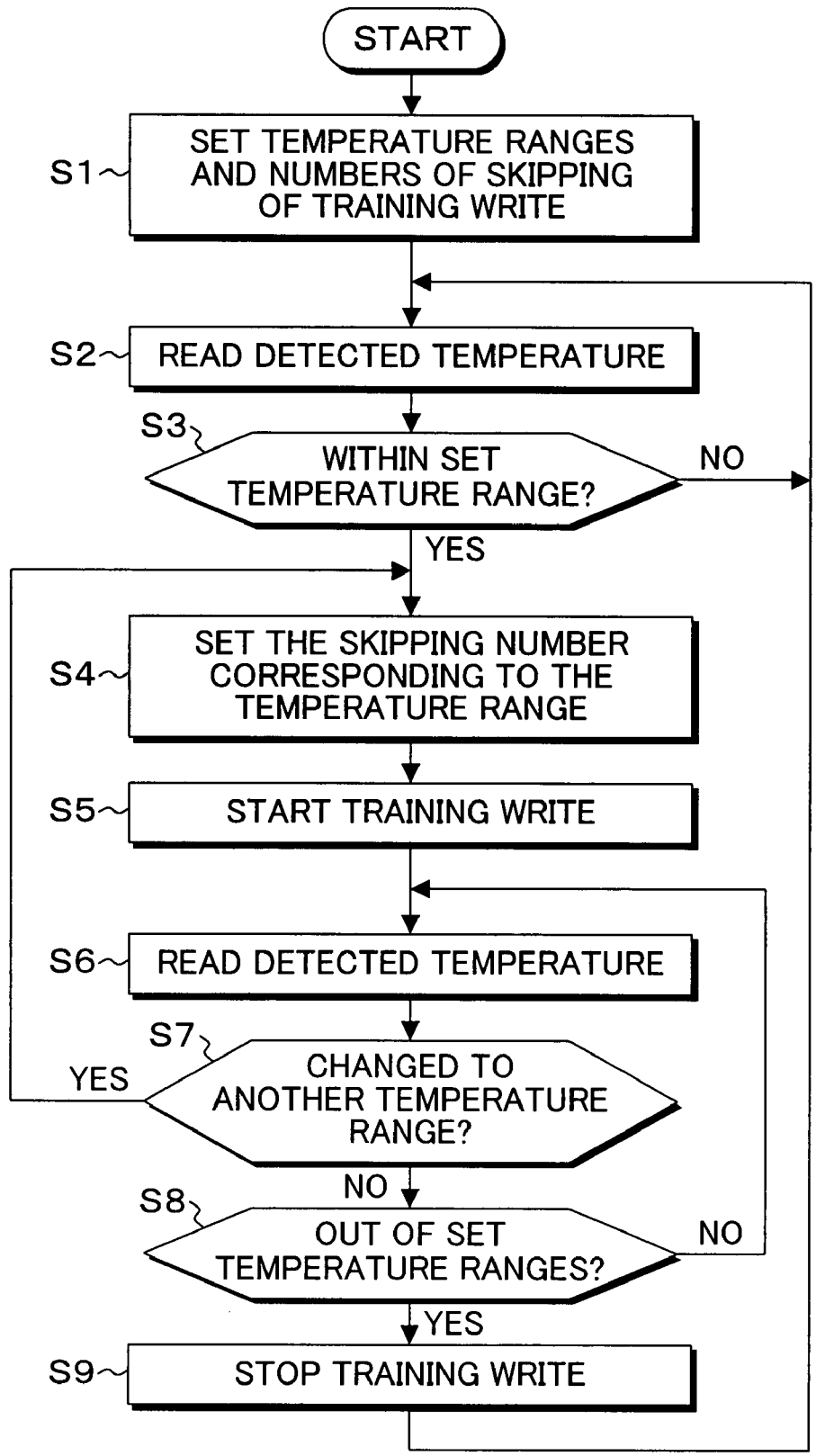
FIG. 9 is a flow chart of the write control process of FIG. 7.

FIG. 9 is a flow chart of the write control of FIGS. 8A to 8F. In FIG. 9, when the power of the magnetic disk apparatus is turned on, the process proceeds to step S1, in which temperature ranges and the skipping numbers of training write are set, in other words, setting of the control table 60 shown in FIG. 7 is performed. Subsequently, the temperature detected by the temperature sensor 35 is read in step S2, and whether it is within the set temperatures or not is checked in step S3. Regarding the set temperature range, for example in the case of the control table 60 of FIG. 7, it is determined to be within the set temperatures when it is 15° C. or less. When it is within the set temperature range, the skipping number corresponding to the temperature range of the control table 60 is set in step S4, and write training is started in step S5. In the write training in step S5, as shown in FIGS. 4A to 4C, training write is executed with respect to the write training sections which are present before the target sector 48 when the write command is received at the time t1. In the training write of this case, training write is selected and executed in accordance with the skipping number, for example, according to the control table 60. When the training write is started in step S5, the detected temperature is read in step S6, whether it is changed to another temperature range or not is checked in step S7. If it has changed to another temperature range, the process returns to step S4 in which the skipping number corresponding to the changed temperature range is set based on the control table 60, and training write is started in step S5. When there is no change to another temperature range in step S7, the process proceeds to step S8 in which whether it is out of the temperature ranges, for example whether it is 15° C. or more in the case of the control table 60 of FIG. 7 is determined. When it is out of the temperature ranges, the training write is stopped in step S9, and the process returns to step S2.

Figure 10:
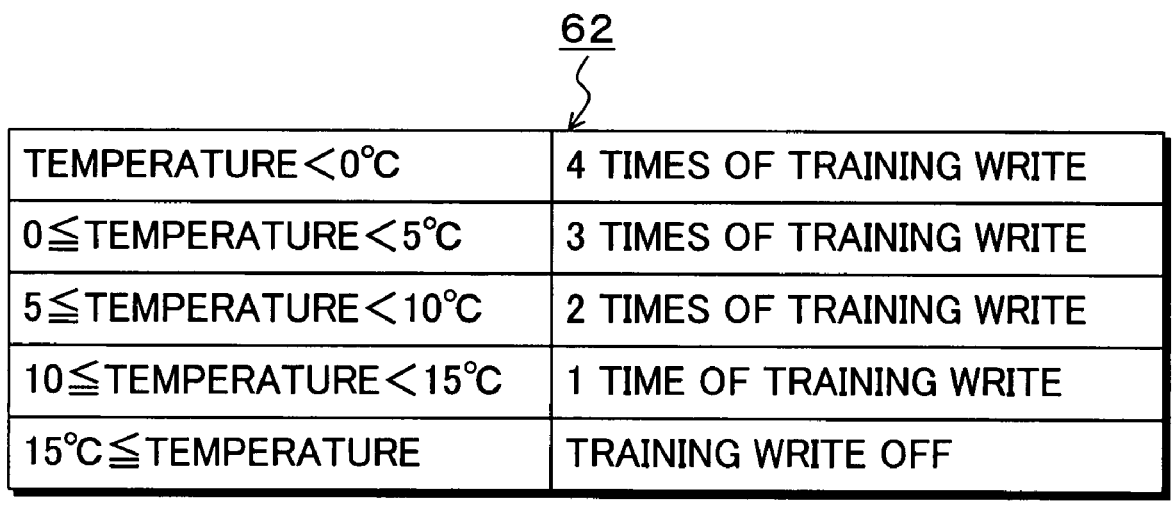
FIG. 10 is an explanatory diagram of a control table in which the number of times of training write corresponding to set temperature ranges are registered.

FIG. 10 is an explanatory diagram of a control table 62 in which the numbers of times of training write are registered corresponding to set temperature ranges in a low-temperature environment. In the control table 62, the temperature ranges are separated into that of less than 0° C., equal to or more than 0° C. and less than 5° C., equal to or more than 5° C. and less than 10° C., equal to or more than 10° C. and less than 15° C., and equal to or more than 15° C., and the lower the temperature range, the less the number of times of training write. Note that training write is turned off at 15° C. or more.

Figure 11:
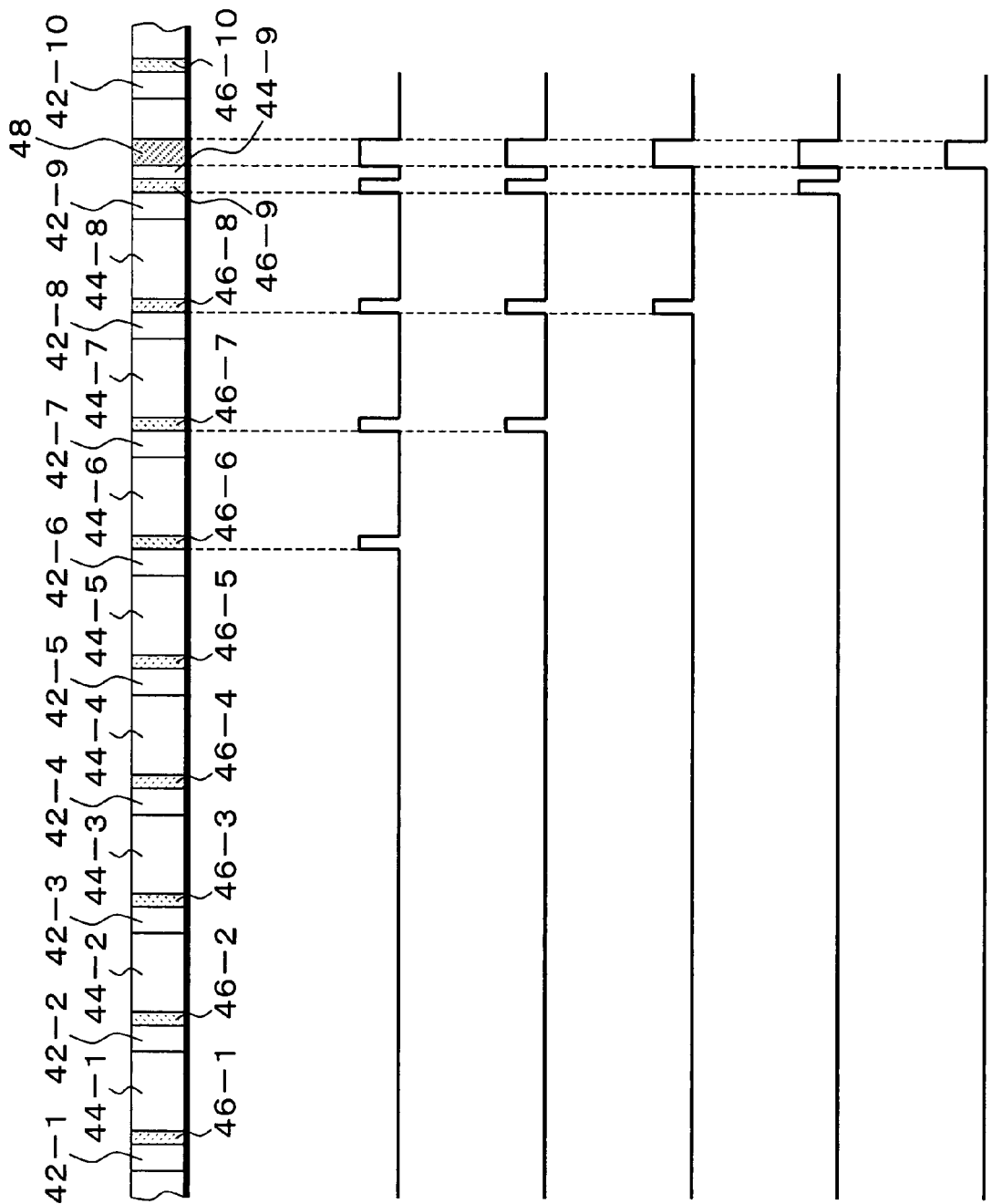
FIGS. 11A to 11F are time charts of write control according to the present invention in which the number of times of training write is changed corresponding to the detected temperature by using the control table of FIG. 10.

FIGS. 11A to 11F are time charts of write control of the present invention in which the number of times of training write is changed corresponding to the detected temperature by using the control table 62 of FIG. 10. FIG. 11A shows a target track in which the target sector 48 is present, and FIGS. 11B to 11F show training write which is execute by making the write gate effective corresponding to the temperature ranges of the control table 62 of FIG. 10 and data write. Note that, in FIGS. 11A to 11F, a write command is issued sufficiently before the target sector 48.

FIG. 11B shows the case in which the detected temperature is less than 0° C., the number of times of training write in the control table 62 of FIG. 10 is four in this case, and the write gate is caused to be effective with respect to four write training sections 46-6, 46-7, 46-8, and 46-9 which are positioned before the target sector 48, thereby executing training write four times; then, data write of the target sector 48 is performed.

FIG. 11C shows the case in which it is equal to or more than 0° C. and less than 5° C., in this case, the number of times of training write is three in the control table 62, the write gate is caused to be effective at the timing of the write training sections 46-7, 46-8, an 46-9, thereby performing training write three times; then, data write of writing data to the target sector 48 is performed.

FIG. 11D shows the case in which it is equal to or more than 5° C. and less than 10° C., the number of times of training write is two in this case; and, furthermore, FIG. 11E shows the case in which it is equal to or more than 10° C. and less than 15° C., and the number of times of training write is one time in this case. Furthermore, FIG. 11F is the case in which it is equal to or more than 15° C., and training write is turned off in this case.

Figure 12:
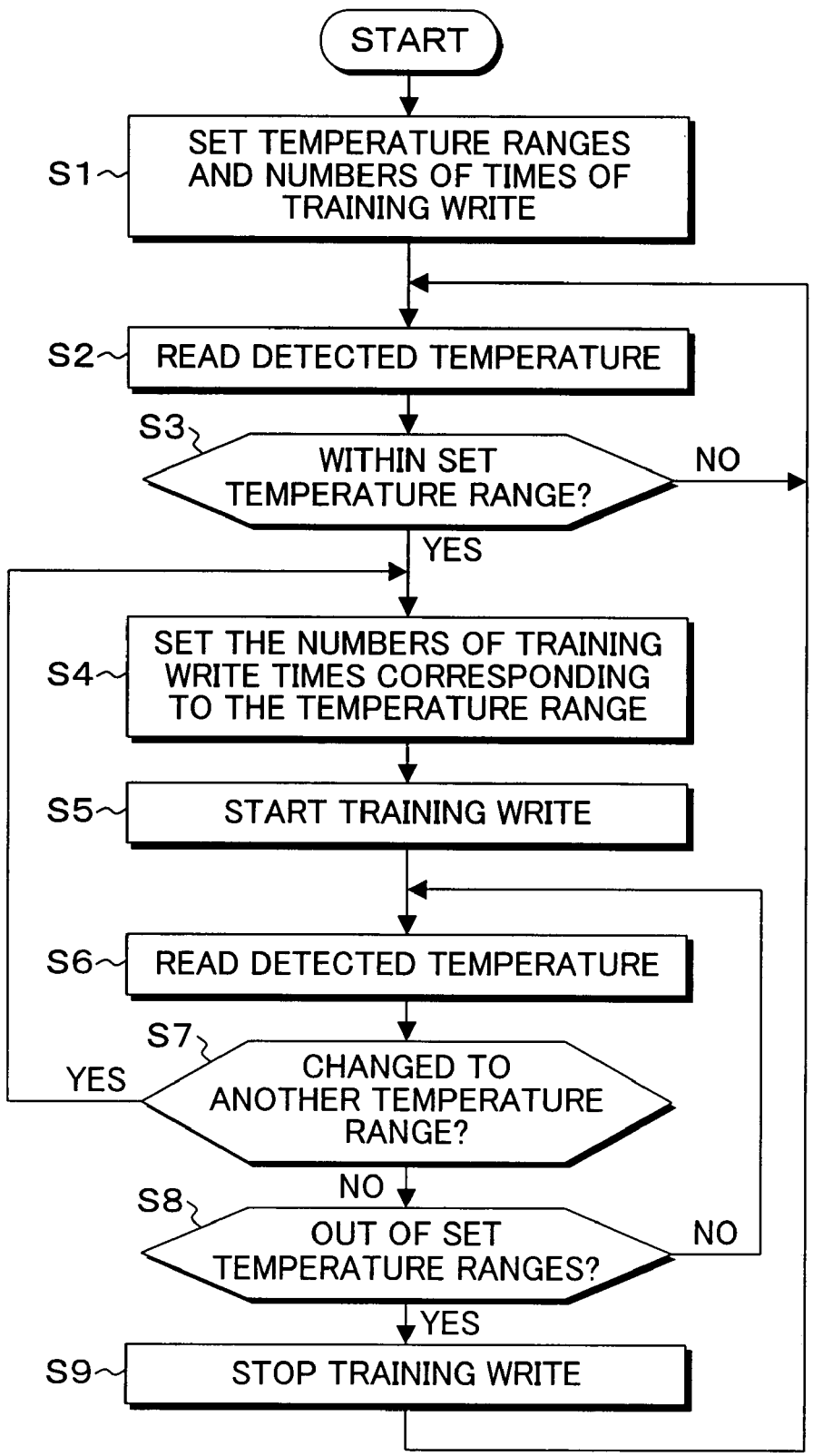
FIG. 12 is a flow chart of the write control process of FIGS. 11A to 11F.

FIG. 12 is a flow chart of the write control of FIGS. 11A to 11F. In FIG. 12, when the power of the magnetic disk apparatus is turned on, temperature ranges and the number of times of training write are set in step S1 as shown in the control table 62 of FIG. 10, the temperature detected by the temperature sensor 35 is then read in step S2, and whether it is in the set temperature range, in other words, a low-temperature environment of less than 15° C., is checked in step S3. When it is within the set temperature range, the number of times of training write corresponding to the temperature range of the control table 62 of FIG. 10 is set in step S4, and training write is started in step S5. Subsequently, the detected temperature is read in step S6, and whether it has changed to another temperature range or not is determined in step S7. When it has changed to another temperature range, the process returns to step S4 in which the number of times of training write obtained by referencing the control table 62 of the changed temperature range is set, and training write is started in step S5. When it has not changed to another temperature range in step S7, whether it is out of the temperature ranges or not, in other words, whether it is equal to or more than 15° C. is checked in step S8. When it is out of the temperature ranges, the training write is stopped in step S9, and the process returns to step S2.

FIGS. 13A to 13C are time charts of write control of the present invention involving training write in a system area of the disk medium. On the disk surfaces of the disk media 20-1 and 20-2 shown in FIGS. 2A and 2B, system areas which are unique to the apparatus and cannot be accessed by users are present. The system area of the disk medium is located other than user data areas, and it is the area in which information unique to the apparatus, such as defect information and error logs on the disk medium is stored. The system area is updated, for example, when a defect is additionally generated on the disk medium while a user is using the apparatus. When it is in a low-temperature environment upon such update of the system area, the writing ability of the head is insufficient at the part of top sectors on which recording has been already performed; therefore, the sectors have the record state that reading is hard to perform therefrom. The system area of the disk medium is read by the MPU 34 when the power of the magnetic disk apparatus is turned on, and the read system information is used in control by the MPU 34 with respect to input/output requests from the host. However, when the error rate of the sector top part is deteriorated due to write in a low-temperature environment and it cannot be read, the magnetic disk apparatus cannot be normally activated since the system information cannot be acquired, and the magnetic disk apparatus causes failure that data cannot be read from the disk medium. Therefore, in the present invention, also regarding the system area of the disk medium, write training sections are disposed, dummy data is written thereto in a low-temperature environment, and the write core of the head is caused to project toward the disk surface side by heating it until it reaches a sector storing system information, thereby enhancing the writing performance so that writing can be performed thereafter.

FIG. 13A shows a track of the system area of the disk medium; and, in this example, four sectors, i.e., sectors n to n+3 are disposed in system information sectors 58 to write system information. In the present invention, in front of the system information sectors 58, training dummy sectors 56 for training serving as write training sections are disposed as three sectors, i.e., a sector n−3, a sector n−2, and a sector n−1.

FIG. 13B shows the write gate generated in the write control for updating the system information of the system information sector 58, wherein the write gate is caused to be effective at the timing of the dummy sectors 56 for training, thereby writing dummy data to the three sectors of the dummy sector 56 for training; and then, the write gate of the system information sectors 58 is caused to be effective, thereby writing system information.

FIG. 13C shows the read gate; and, in this case, as well as a normal case, the read gate is caused to be effective with respect to the system information sectors 58, thereby reading the system information from the sectors n to n+3, and it is used by the MPU 34. The present invention also provides a computer provided in the magnetic disk apparatus 10 of FIGS. 2A and 2B, more specifically, a program executed by the MPU 34. The program has the contents shown in the flow chart of FIG. 5, FIG. 9, or FIG. 12. Note that, the above described embodiment takes the case, as an example, in which training write is executed in the state in which it is positioned on the track of the target sectors; however, training write may be executed during seek with respect to the track of the target sector. The training write during the seek is performed at the timing that the head is performing seek over the area in which the write training sections are arranged in the radial direction. The present invention also includes arbitrary modifications that do not impair the object and advantages thereof and is not limited by the numerical values shown in the above described embodiments.

The invention claimed is:

1. A storage apparatus for recording information by using an inductive-type write head, characterized by having
   a storage medium in which, in addition to a servo section in which servo information is recorded and a data section to or from which data is to be written or read, a write training section on which training write of pseudo-data is to be performed is disposed on a recording track; and
   a write control unit which writes the pseudo-data to the write training area and then writes data to the data section,
   wherein when a write command is received in a state in which a use temperature is equal to or less than a predetermined temperature, the write control unit writes the pseudo-data to the write training section.

2. The storage apparatus according to claim 1, wherein, in the storage medium, the servo section, the data section, and the write training section are repeatedly disposed on the recording track.

3. The storage apparatus according to claim 2, wherein, in the storage medium, the write training section is disposed immediately after the servo section.

4. The storage apparatus according to claim 2, wherein, the data section of the storage medium is divided into a plurality of sectors, and the write training section is disposed in front of the top sector of the plurality of sectors.

5. The storage apparatus of claim 1, wherein, when the write command is received in the state in which the use temperature is equal to or less than the predetermined temperature, the write control unit writes the pseudo-data to the write training section which is present between the point when the write head becomes writable on a target track and the data section serving as a write target.

6. The storage apparatus of claim 1, wherein, when write command is received in the state in which the use temperature is equal to or less than the predetermined temperature, the write control unit selects write training sections from among a plurality of write training sections present between the point when the write head becomes writable on a target track and the data section serving as a write target and writes the pseudo-data to more write training sections as the use temperature decreases.

7. The storage apparatus of claim 1, wherein, when a write command is received in the state in which the use temperature is equal to or less than the predetermined temperature, the write control unit selects a write training section from among a plurality of write training sections present between the point when the write head becomes writable on a target track and the data section serving as a write target and writes the pseudo-data to the write training section so that the lower the use temperature, the larger the number of times of training.

8. The storage apparatus of claim 1, wherein, when the use temperature is equal to or less than the predetermined temperature, the write control unit continuously writes the pseudo-data to the write training section without depending on the write command.

9. The storage apparatus of claim 8, wherein, the write control unit selects the write training section and writes the pseudo-data to more write training sections as the use temperature decreases.

10. The storage apparatus of claim 8, wherein, the write control unit selects the write training section and writes the pseudo-data to the write training section so that the lower the use temperature, the larger the number of training times.

11. The storage apparatus according to claim 1, wherein,
in the storage medium, the write training section is disposed in front of a data section on a track of a system area; and
the write control unit writes the pseudo-data to the write training section when system information is to be written to the data section of the system area in the state in which the use temperature is equal to or less than the predetermined temperature.

12. A storage medium for recording information by using an inductive-type write head, wherein,
in addition to a servo section in which servo information is recorded and a data section to or from which data is to be written or read, a write training section on which training write of pseudo-data is to be performed is disposed on a recording track,
wherein when a write command is received in a state in which a use temperature is equal to or less than a predetermined temperature, the pseudo-data is written to the write training section.

13. The storage medium according to claim 12, wherein, the servo section, the data section, and the write training section are repeatedly disposed on the recording track.

14. The storage medium according to claim 13, wherein, the write training section is disposed immediately after the servo section.

15. The storage medium according to claim 13, wherein, the data section is divided into a plurality of sectors, and the write training section is disposed in front of a top sector of the plurality of sectors.

16. The storage medium according to claim 12, wherein,
a write training section is disposed in front of a data section on a track of a system area.

17. A control method of a storage apparatus for recording information by using an inductive-type write head, the apparatus having a storage medium in which, in addition to a servo section in which servo information is recorded and a data section to which data is to be written, a write training section on which training write of pseudo-data is to be performed is disposed on a recording track,
when a write command is received in a state in which a use temperature is equal to or less than a predetermined temperature, writing the pseudo-data to the write training section.

18. The control method of the storage apparatus according to claim 17, wherein,
in the storage medium, the write training section is disposed in front of the data section on a track of a system area; and,
wherein the pseudo-data is written to the write training section when system information is to be written to the data section of the system area in the state in which a use temperature is equal to or less than a predetermined temperature.

* * * * *